US011611812B2

(12) United States Patent
Jönsson et al.

(10) Patent No.: US 11,611,812 B2
(45) Date of Patent: Mar. 21, 2023

(54) METHOD FOR ASSESSING AMBIENT LIGHT DURING NIGHT MODE IMAGE ACQUISITION

(71) Applicant: Axis AB, Lund (SE)

(72) Inventors: Jimmie Jönsson, Lund (SE); Pontus Rosenberg, Lund (SE); Ola Håkansson, Lund (SE); Axel Thuresson, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/169,597

(22) Filed: Feb. 8, 2021

(65) Prior Publication Data

US 2021/0306546 A1 Sep. 30, 2021

(30) Foreign Application Priority Data

Mar. 26, 2020 (EP) ..................................... 20165854

(51) Int. Cl.
*H04N 5/235* (2006.01)
*H04N 23/74* (2023.01)
*H04N 23/56* (2023.01)

(52) U.S. Cl.
CPC ............. *H04N 23/74* (2023.01); *H04N 23/56* (2023.01)

(58) Field of Classification Search
CPC ........................... H04N 5/2354; H04N 5/2256
See application file for complete search history.

(56) References Cited

U.S. PATENT DOCUMENTS

| 10,009,554 | B1* | 6/2018 | Miao ..................... H04N 5/2351 |
| 10,064,552 | B1* | 9/2018 | Vaziri ....................... H04N 5/76 |
| 10,136,076 | B2 | 11/2018 | Tanaka et al. |
| 2011/0193967 | A1* | 8/2011 | Matsumoto ........ H04N 5/23245 |
| | | | 348/E5.09 |
| 2011/0221350 | A1 | 9/2011 | Staab |
| 2020/0126378 | A1* | 4/2020 | Van Cleave ........... H04N 5/265 |
| 2020/0219271 | A1* | 7/2020 | Davis ...................... G06T 7/277 |

FOREIGN PATENT DOCUMENTS

WO 2019/157096 A1 8/2019

* cited by examiner

*Primary Examiner* — Jonathan R Messmore
(74) *Attorney, Agent, or Firm* — Xsensus LLP

(57) ABSTRACT

A method for assessing an ambient light level during video acquisition with a video camera is provided. The video camera is operably connected with an IR illuminator, and having a day mode in which an IR-cut filter is arranged in front of an image sensor and a night mode in which the IR-cut filter is not arranged in front of the image sensor. The method comprises:
  acquiring a stream of images with the video camera in night mode, with the IR illuminator having a first illumination output level, and then
  reducing an output level of the IR illuminator to a predetermined illumination output level during acquisition of a sequence of a predetermined number of consecutive image frames within the image stream, and then
  assessing a measure representative of an ambient light level from an evaluation of the sequence of image frames.

15 Claims, 2 Drawing Sheets

METHOD FOR ASSESSING AMBIENT LIGHT DURING NIGHT MODE IMAGE ACQUISITION

CROSS-REFERENCE TO RELATED APPLICATION

This application claims priority to European Patent Application No. 20165854.9, filed on Mar. 26, 2020, the entire disclosure of which is incorporated by reference herein.

TECHNICAL FIELD

The present invention relates to a method, in a video camera, for assessing a measure of ambient light during night-mode image acquisition. The present invention also relates to a method for timing a switch from night-mode operation to day-mode operation in a video camera.

TECHNICAL BACKGROUND

The use of IR (infra-red) filters for cameras is well known in the art, and in particular in relation to digital cameras. In short, the image sensor of the camera has a spectral response with a non-negligible component in the infrared, resulting in opportunities as well as in challenges. An opportunity lies in that in low-light conditions the IR-component may provide useful additional information about the imaged scene, information which may be enhanced even further by means of an IR-light source. A challenge is found during day-time imaging, where the addition of an IR-component will distort the color balance in the image, and it may also saturate the image sensor. Furthermore, since the camera will detect the radiation, parameters such as exposure settings may be affected in a way being detrimental to the displayed image.

A way of maintaining the beneficial effects while suppressing the less beneficial effects is to add a movable IR-cut filter in the beam path in front of the image sensor during day-mode operation. In this way, the IR filter may be used during daylight conditions, enabling acquisition of color images. Throughout the application "IR-cut filter" and "IR-filter" may be used interchangeably, and unless explicitly stated "IR-filter" will in the present context correspond to an IR-cut filter. During day-mode operation pixels of the image sensor will operate in a first manner, where the incident light detected as a charge on individual photodetectors, each photodetector being provided with filter so as to receive mainly red, mainly green, or mainly blue radiation, thus enabling color separation. During night-mode operation, e.g., in low-light conditions, the IR-cut filter may be removed. This means that there will be an increase in incoming light (or radiation) emanating from the IR-portion of the spectrum, an increase that can be used to improve the image quality but with the price of render color imaging difficult or impossible. Without IR-cut filter the IR radiation will add intensity in every color channel, since every color channel has a response in the IR-region. This will skew the color information by the addition of an unknown factor in each color channel. Therefore, instead of performing a color separation during night-mode operation, the only parameter being maintained is the total intensity of the incoming radiation, for each pixel, which may be presented as a gray-scale intensity image (or in any desirable color scale). The addition of an IR light source may enhance the image even further.

In the straightforward solution an IR-cut filter is arranged in front of the sensor, and an actuator is used for moving the filter between a position in which it completely covers the sensor ('day-mode') and a position in which it is completely removed from obscuring the image sensor ('night-mode'). When, starting from night-mode and a retracted filter, the IR-cut filter has been inserted, the image sensor can deduce if the amount of ambient light is sufficient or not. If it is not, the camera will switch back to night mode. When switching from night-mode to day-mode it is not uncommon that the light level with the IR-filter in the beam path is too low, and that a switch back to night-mode is necessary, resulting in a back-and-forth flickering between night-mode and day-mode. This results in noticeable flickering of the image, and a considerable wear on the actuator. Consequently, switching back and forth is not beneficial to user experience, and therefore there may be an assessment prior to the switch, in which the imaging unit tries to deduce the amount of visible light in the scene so as to be certain that a switch to day-mode is advisable.

For that purpose an auxiliary light sensor may be used for controlling when to insert and when to remove the IR-filter, such that when the level of ambient light becomes too low, the camera switches to night mode by removing the IR filter and optionally using an IR light source, either carried by or incorporated in the camera, or arranged externally thereof, and when the ambient light level is sufficiently high a switch to day-mode may be performed. For many applications this solution provides an acceptable result, yet adding a further component adds to the cost and the complexity of the end-product. Also, most light sensors only measure an ambient overall light level, which results in that local variations in light level within an imaged scene may not be accounted for.

Various other methods are known, using different approaches for determining when to switch between day-mode and night-mode in a camera system. For instance, US 2011/0193967 discloses control unit that switches an image device between night and day mode. In the process to transfer from night mode to day mode the gain is first reduced, in a next step the IR illumination is gradually reduced to zero. In a last stage, when the switch is about to take place, the gain is further reduced and when reaching a threshold level, the actual switch to day mode is carried out.

WO 2019/157096 is directed to a surveillance camera and discloses that the selection of night or day mode is based on an analysis of the ratio of red, blue and green gain, together with analysis of the general gain setting, the shutter speed and the iris setting of the camera.

US2011/0221350 discloses an auto-calibration method for an ambient light sensor in a lighting control system. At least three levels of ambient light and corresponding ambient light level thresholds are determined for used when indicating when the control unit should switch between the different levels. The document discusses how to configure the system by determining the thresholds based on measurements. The present invention mainly relates to improvements in IR-filter control by the provision of an improved method for acquiring a measure of ambient light level, in particular when operating in night-mode.

SUMMARY

In an effort to provide improvements in IR-filter control, the present invention, according to a first aspect thereof, provides a method for assessing an ambient light level during video acquisition with a video camera. The video camera is operably connected with an IR illuminator, and it is configured to have an operational day mode in which an IR-cut filter is arranged in front of an image sensor and an operational night mode in which the IR-cut filter is not arranged in front of the image sensor. The method comprises acquiring a stream of images with the video camera in night mode, with the IR illuminator having a first illumination output level, and then reducing an output level of the IR illuminator to a predetermined illumination output level during acquisition of a sequence of a predetermined number of consecutive image frames within the image stream, where the reduction of the output level of the IR illumination is a sudden change. Following the image acquisition the method comprises assessing a measure representative of an ambient light level from an evaluation of the sequence of image frames, and using the assessed measure as input to a controller for the IR-cut filter, and if the assessed measure passes a threshold value, switch the video camera to day mode operation.

The inventive method enables a straightforward and swift assessment of an ambient light level, and the length of the sequence of image frames may be adapted to a particular situation or the mode in which the camera is operating at the time of the assessment. Furthermore, the entire image sensor of the video camera may be used as an ambient light sensor, which has several beneficial effects.

In a further embodiment the output of the IR illuminator may be increased again following the reduction, preferably to the original illumination output level that it had prior to the reduction. In this way the assessment may be performed in a more or less imperceptible manner, at least to an operator observing the acquired video.

The measure representative of the ambient light level may be selected from the group comprising: a measure of current exposure, a measure of signal-to-noise ratio, and a measure of a light intensity, or any combination thereof. In any embodiment it will be beneficial to use a measure which is deduced in the camera anyway, since this will vouch for minimizing the additional processing power necessary, as well as fast processing.

As mentioned, the method comprises using the assessed light level as input to controller for the IR-cut filter, and if the assessed light level passes a threshold value, switch the video camera to day mode operation. This results in a reliable method for timing a switch from night mode operation to day mode operation. Depending on which measure is used, the switch could be performed when an actual value falls below a predetermined value or when an actual value increases above a predetermined value, but in any case, it will still be indicative of the ambient light level having reached or exceeded a particular predetermined level.

In an effort to reduce any disturbing impact of the inventive method, it may comprise, in one or more embodiments thereof, processing the sequence of image frames acquired with reduced IR illumination such that their brightness resembles that of the surrounding frames. In this way the sequence of frames acquired with reduced IR illumination may be kept in an image stream without, e.g., disturbing an operator viewing the resulting video material (live or from recorded data). It may be preferred to adjust the frames prior to encoding them in an encoder of the video camera, which will be elaborated below and in the detailed description. Adjusting the exposure time for the sequence of image frames may be one further option, another may be to increase the gain (analogue or digital), or any other parameter that would be reasonably simple to adjust on the fly (i.e. in the sense that it will be fast enough not to disturb the video stream), based on evaluation of image frames or based on statistical data. A straightforward example would be to use metadata, which is frame specific information concerning e.g. the setting for camera parameters used when acquiring a particular image frame, to make the adjustment. A darker image frame (as a result of a lower IR-illumination) could be compensated with relative ease, and although the noise level is likely to increase the general visual impression of the image (e.g. as a single image frame in a 30-fps image stream) may not be significant. Combinations may of course also be applied, e.g. both altering the exposure time as well as the gain (or other parameters).

In embodiments where it is decided that the sequence of image frames will not be shown, they could either be removed from the image stream or marked as "no-display" or "skip frame", whichever is easiest for the coding standard used (suggestively h.264 or h.265, but by no means limited to these). In other embodiment the image frames of the sequence are also removed from analytics—other than the one needed for performing the ambient-light assessment. In this way the image frames from the sequence will not affect evaluations and control of imaging parameters such as white balance, exposure settings, noise filters, etc., which otherwise could affect the experience in a negative manner.

In one or more embodiments the output from the IR-illuminator is reduced to zero, in order to give an immediate feedback regarding the expected ambient light level following a potential switch to day-mode operation, while in other embodiments it is reduced to a value greater than zero, such as to 10%, 20%, . . . , 50% etc.

In a particularly preferred embodiment, the sequence of frames contains a single image frame only. In the particular embodiment the single frame is preferably removed from being displayed in the image stream, and processing of the image frame is not performed for the purposes of controlling image data other than the ambient light assessment. Theoretically, although still not the most preferred, this embodiment may be combined with any other embodiment where the image frame is not removed from display. There may be instances where the appearance of a single dark frame is not very disturbing, e.g. in a 30-fps image stream. It would still be advisable not to use image data from the single frame for the purposes of controlling camera parameters (such as exposure time or gain) or display parameters (such as white balance) since that could affect several consecutive frames and by that become more noticeable.

In one or more embodiments the IR illuminator may comprise several different IR-LEDs. In such a setup control of the output may be performed on a selection of LED:s. Instead of reducing the output to 50% on every LED, half of the LED:s could be reduced to zero, the rest could be maintained unchanged. The same approach could be used for other reduction ratios. A benefit of this embodiment could be that it may be easier, faster, and more reliable to switch from 1 to 0 than from 1 to a fraction of 1, while still having the advantage of not removing all IR illumination of the scene.

The inventive method, according to any embodiment thereof, could be initiated on the basis of input from a timer, e.g. at a particular time of day. The timer could be more or less advanced, and could account for geographical position, weather forecast, statistics from previous days, etc. with the goal to initiate the method at a suitable time (and not to try to make an assessment at a time when the result is fully predictable). An example could be that the method is not performed at all during the night, while at the time of the expected dawn it checks the ambient light at regular intervals (such as every 5 or 10 minutes). In other embodiments the method may be performed at a specific frequency during some time periods and at another, higher, frequency during other time periods, etc.

In other embodiments the initiation may be triggered by an event in the imaged scene, such as a change in brightness, or another external event that could indicate that there is a change in ambient light level that could be worth evaluating.

In further embodiments the method may comprise checking an operation mode of the camera, and wherein adjustment of the IR illuminator may be postponed based on the operation mode of the camera. It may in several different scenarios be unfortunate to alter imaging modes during image acquisition, e.g. during tracking, etc. On the one hand it could affect the ongoing process, and on the other hand the ongoing process may occupy the processing power needed for the ambient light assessment. Further examples include situations where the camera is in motion, such as during a pan, tilt or zoom operation, or other situations where the scene is not more or less stable. If the scene is changing, making the assessment less certain, this may be addressed by performing the inventive method a number of consecutive times, and to demand a robust assessment for the method to proceed into actually switching to day-mode.

In one or more embodiment the ambient light level is assessed in a specific area of each image frame of the sequence. This embodiment discussed in more detail in the detailed description, yet it basically corresponds to selecting a portion for evaluation with the intention of making full use of the possibilities of the present invention. It could also correspond to removing a portion from being assessed, e.g. based on that it is not believed to be representative or relevant to the imaged scene as a whole.

According to another aspect the present invention provides a video camera for performing the inventive method comprising an image sensor, an IR-cut filter arranged in front of the image sensor in day mode and not arranged in front of the image sensor in night mode, and an IR illuminator connectable to said IR illuminator. The video camera further comprising a control circuit for the IR illuminator. Said control circuit comprising a trigger unit for reading an output trigger signal from an image sensor, and for timing the control of the IR illuminator to the operation of the image sensor read-out.

According to yet another aspect the present invention relates to a computer readable medium containing program instructions for causing a camera processor to perform the method of any one of the mentioned embodiments.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description. Hence, it is to be understood that this invention is not limited to the particular component parts of the device described or steps of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

DETAILED DESCRIPTION OF EMBODIMENTS

Figure 1:
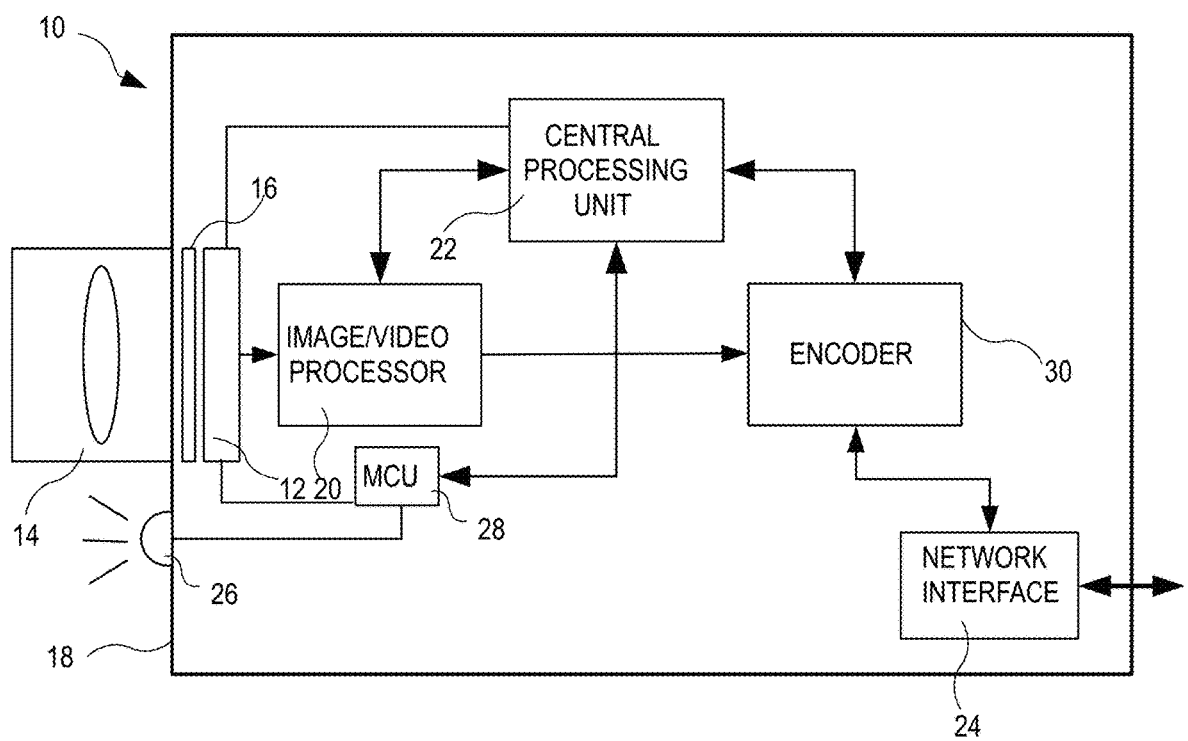
FIG. 1 is a schematic view of a camera setup, according to a generalized embodiment of the present invention.

FIG. 1 illustrates a camera setup prepared for performing the present invention according to various embodiments thereof. A surveillance camera 10 has an image sensor 12 and imaging optics 14, with an IR-cut filter 16 arranged in front of the image sensor 12. The IR-cut filter 16 is arranged in an actuator so that it can be inserted and retracted from its position in front of the image sensor 12, which is what is done when switching between day-mode operation and night-mode operation.

Figure 2:
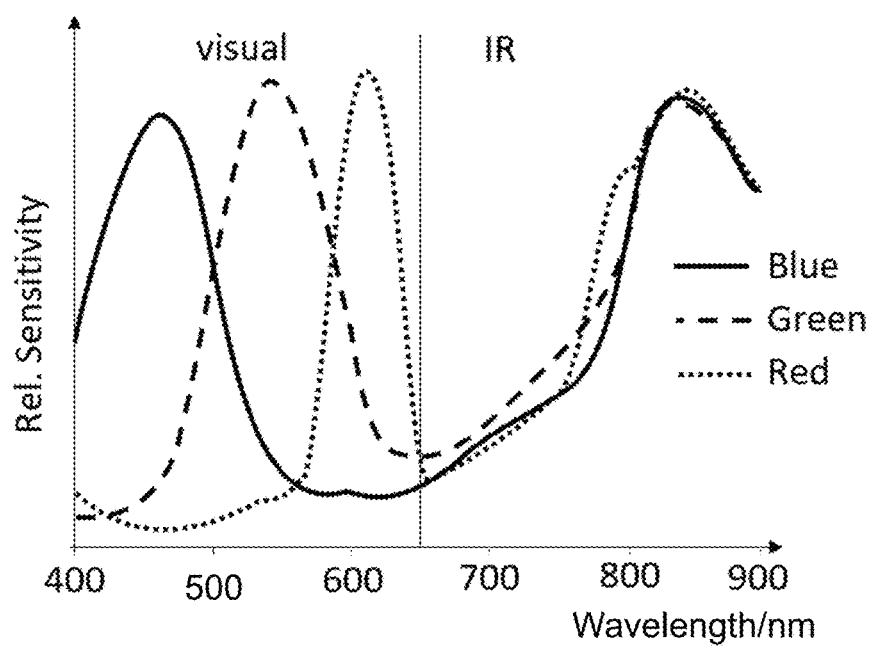
FIG. 2 is a schematic diagram illustrating the spectral response of a standard sensor chip.

Referring briefly to FIG. 2, when the filter is arranged in front of the sensor during day-mode operation the entire IR-portion of the spectrum is removed, meaning that a signal measured by the red, green and blue channel, respectively, may be resolved and converted to a color image. The incident light is separated into different color channels by use of a color filter array arranged in front of, or even combined with, the image sensor. A Bayer filter is a color filter array commonly used for this purpose. Notably, as indicated in FIG. 2, each color channel has a spectral response in the NIR spectral region, and as the IR-cut filter is removed from the image sensor this part of the spectrum will be incident on the image sensor as well. This will significantly increase the amount of collected radiation at the cost of losing the spectral resolution, which is why it is common practice to use a grayscale representation in night-mode imaging. An image quality may be further increased by arranging an IR-illumination source, providing an "invisible" illumination having the desired effect while still not being visible or disturbing to the human eye.

Returning to FIG. 1, the video camera has a housing 18. In FIG. 1 the housing is rectangular, yet it should be noted that the camera housing may take many different forms, and for the purposes of the present invention any known form may be used (not excluding unknown forms, unless they make it impossible to realize the invention). Furthermore, the functions performed by the camera may be effected in different units, such that an image is collected in one physical location and transferred for processing via a wire (or wireless) to another unit. Such approaches are not uncommon in applications where it is a benefit that the image collection portion of the camera is kept as small as possible. An image processor or video processor 20 (or a combination thereof) is arranged to process image data collected by the image sensor, and to feed it forward to an encoder 30. A central processing unit 22 is arranged to control the processes. In most cases the camera (or one of the units, referring to the above text) will also comprise a network interface 24 for communication beyond the constraints of the camera. The above description is understandably a very simplified account for a modern video camera, and for a more detailed knowledge the interested reader may turn to the product portfolio of the present applicant. The overall flow obviously has the direction from the image sensor 12 towards the encoder 30 and the network interface 24, yet there are feed-back mechanisms going the other way as well.

Furthermore, the video camera of FIG. 1 comprises an IR-illumination source 26. In the illustrated embodiment the IR-illumination source is arranged on the housing 18, yet it may in other embodiments be provided as a separate device connected to the camera and controlled by the camera or an external controller also controlling aspects of the camera. The schematic representation also covers an embodiment where the IR-illumination source is an array of several IR-illuminators. If needed an additional control unit (exemplified by the microcontroller unit, MCU, 28) may be added for controlling the IR-illumination source, although this control may be included, or said to be included, in the central processing unit as well. Furthermore, an additional driver unit (not shown) may be arranged for supplying power to the IR-illumination source, or rather supply and control the power supplied to the LED in a suitable way for the purposes of the present invention. The driver unit could also provide the control otherwise provided by the CPU or the MCU. An example of a suitable IR-illumination source would be a high-power infrared emitter of a LED-type, which is a type that is commercially available. The LED may advantageously be possible to power in a DC-mode as well as in a burst mode. Another feature which is beneficial is that the IR-illuminator has a stable and repeatable output of illumination, so that an assessment of ambient light level does not affect the performance of other processes or becomes visible in image frames acquired immediately following the sequence of frames used in the evaluation. As will be clear from the following, the present invention will put some requirements on the performance of the IR-emitter, yet these requirements are met by several commercially available emitters. Again, it should be noted that the described layout of a video camera (IP camera or surveillance camera), on the particular level of detail, does not extend beyond what is known in the art. Commercially available LED:s, as used in current installations, have a response time such that the output intensity may shift from 1% to 99% in less than half a millisecond, which suits the future application area of the present invention where 30 fps or 60 fps are common framerates being used. It will be preferable to have a delicate timing between image acquisition and control of the IR-source, so as to ensure that the assessment of the ambient light level may be performed with as little impact as possible. For that purpose, a trigger unit may be needed. The trigger unit may be a physical unit, but in an actual application it would rather be a summarizing term for functions performed by different units in the video camera, emanating from an output trigger signal from the image sensor. As an example, a signal to initiate the assessment may be produced by the central processing unit 22, and it may receive an output trigger signal from the image sensor 12 (or control thereof) regarding when image frames are acquired, so as to enable timing with the control of the IR illuminator 26. In such an embodiment the trigger unit could correspond to the central processing unit 22 and its cooperation with the image sensor 12 and the IR-illuminator control unit. In other embodiments such output trigger signal may also, or instead, be sent directly to the MCU 28 or other driver unit (not shown) controlling the IR illuminator, so as to reduce lag and improve control, in which case the trigger unit basically would correspond to the image sensor and its cooperation with the MCU or driver unit. The actual setup could differ between different video cameras, yet the realization of the trigger functionality would still be a straightforward task for the skilled person.

Figure 3:
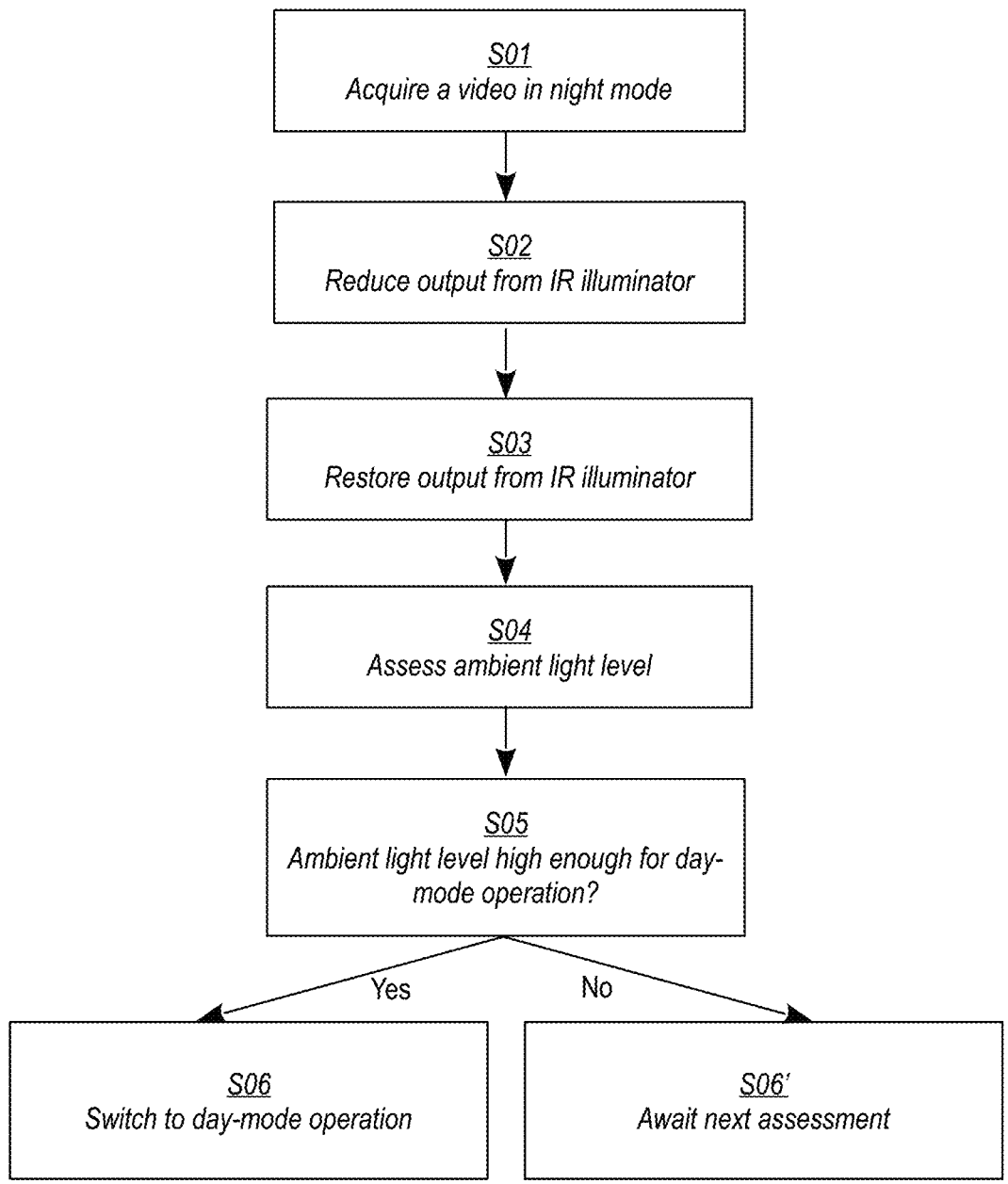
FIG. 3 is a flowchart outlining the main steps of the present invention, according to one or more embodiments thereof.

Since the invention mainly resides in the control method, we will now turn to FIG. 3.

FIG. 3 is a flowchart illustrating an inventive method, according to one embodiment thereof. One goal of the present invention is to provide a reliable and improved method for determining when to perform a transfer from night-mode operation to day-mode operation. The method starts from the camera operating in night-mode, in step S01. To reiterate, in this mode the IR-cut filter is retracted from the image sensor, and the spectral sensitivity of the image sensor is the only limiting factor. Also, at this time, the IR-illumination source is active, and it is reasonable to assume that a major portion of any IR-light registered by the sensor emanates from the IR-illumination source. In this night mode image frames may be captured by the image sensor.

As a consecutive step S02 an output from the IR-illumination source is reduced during the time when a sequence of image frames is being captured, after which the IR-illumination may be restored to its previous setting in step S03. Following the reduction of the output from the IR-illumination source there is image data available for assessing an ambient light level, which is done in step S04. In theory the process is straightforward: The IR-illumination source is controlled to reduce the output to a known level, e.g. 50%, and hence the amount of IR illumination collected by the imaging optics and the image sensor would be reduced by a corresponding or at least correlated amount, while the amount of visual light can be considered to be unchanged. By evaluating images or sequences of images with different, and known, amounts of IR-illumination it will be possible to deduce measure of an actual IR-contribution. When knowing the IR-contribution it is possible to deduce the contribution of visual light, and thus it will be possible to assess the amount of visual light and make an evaluation regarding if this amount will be sufficient for a successful transfer to day-mode operation. Depending on the measure used, the IR-illumination may be reduced to a fraction of the original illumination or reduced to zero. This is elaborated later in the application, when exemplifying some possible measures that could be used.

Once the actual image data needed for the assessment of the amount of ambient light level is collected, the calculations are similar to those presented in other patent applications of the present applicant. Although those applications refer to variations in performance of the IR-cut filter, the result may be used for the same type of decision. For embodiments where the IR-illumination is switched off completely it may be enough to evaluate the ambient light level, using any of the measures discussed, for the sequence of image frames in isolation. Depending on the speed of the processing, the assessment may be performed prior to the restoration of IR-illuminator output, in which case the order of S03 and S04 would be reversed. Furthermore, also depending on the speed of the processing of the assessment the illumination may not have to be restored at all if the decision is that a switch to day-mode imaging is preferable. In this context "ambient light level" of step S04 should be construed as the light level available without the use of radiation from the IR-illumination source 26. In step S05 the assessment of the ambient light level is used when deciding whether to transfer from night-mode operation to day-mode operation or not. If the decision is "switch", the IR-illumination source may be turned off (or not turned on again, depending on the situation), and the IR-cut filter is inserted in front of the image sensor. If not, the IR-illumination will remain on and the filter control will await the next assessment, the timing of which will be discussed elsewhere in the description.

There are several measures used for assessing an ambient light-level in a scene, and the present invention is not exclusively devoted to any particular one. The value used may be a value that comes from any existing image processing algorithm, the important thing being that the value is robust and reliable for the particular camera setup.

It may be noted that within the definitions above the IR-illumination source 26 could be an array of several IR-sources. To exemplify, it is a common solution to have a number of IR-sources arranged around the lens of a surveillance camera. A reduction in intensity could then be effected by varying the output of a selection of the IR-sources in the array. As an example, if it is desired to reduce the output by 50%, half of the IR-sources in the array could be switched off, while the others are maintained at their original output. This is in contrast to the straightforward and most probable alternative namely, to adjust the drive properties of a single IR-source or a number of IR-sources in parallel.

There are some parameters to discuss further. The first one is the power reduction of the IR-illuminator output. It is readily understood that by knowing the reduction in output makes it possible to extrapolate an effect of reducing the output to zero, which is where we find our definition of the ambient light level. The larger the reduction, the easier it is to extrapolate to make an assessment of the ambient light level. However, the larger the reduction, the more noticeable it will be for an operator, and for any algorithm using the pixel intensity as an input for that matter. This could imply that the length of the sequence of frames, being another parameter for further discussion, should be reduced as the intensity reduction is increased. According to one embodiment, said sequence of frames contains only one frame, essentially resulting in that the reduction can be performed without disturbing the operator as its duration is too short to be noticeable for the human eye. This is particularly beneficial when the IR illumination output is decreased to zero and the acquired image is forwarded with the rest of the image stream for display to an operator, but it could equally well be used in other cases, where the output is reduced enough not to result in a visual effect in video data shown to an operator.

The sequence of image frames acquired with reduced or removed IR-illumination will represent an anomaly compared to the surrounding image frames (the image frames before and after the sequence). Depending on the situation such anomaly may have some detrimental effects. The most apparent one would be that a sudden reduction in intensity may result in a flicker, which, if not compensated for, may disturb an operator observing the scene via a display. Minimizing the length of the sequence to a single or a low number of frames may be a sufficient measure for addressing this effect. Another issue may be that a sudden change in intensity may trigger a motion detector, thus generating a false detection of movement in the scene. This may be solved by having the central processing unit 22, or the image/video processor 20, tag the frames acquired with reduced IR-illuminator output, such as to withhold them from a video stream from the camera, or merely to mark them such that they are not shown or used in any evaluation, which is an option being readily available in present encoding standards, such as h.264 and h.265, etc. Consequently, the central processing unit 22 may withhold evaluation of the sequence of frames with algorithms not directly associated with the assessment of ambient light, meaning that a possible fluctuation in pixel intensity does not result in a false detection of movement in the scene monitored by the camera, or in an erroneous adjustment of white balance, etc. In relation to the first effect, that the video may flicker, this may be addressed by other measures as well. If the sequence of frames is to be shown to an operator, and if the effect is considered to be visible, a gain could be applied to the image frames of the sequence, so as to make their overall intensity mimic that of the surrounding image frames. Such correction may be carried out automatically by the image processor handling the digital image stream. Alternatively, or in addition, the exposure (i.e. exposure time and gain) could be altered for the frames in the sequence, so that the total intensity may be closer to the one of the surrounding frames. A change in exposure may be readily accounted for in the assessment of ambient light, both for embodiments where the output is reduced by a fraction smaller than 100%, and embodiments where there is a 100% reduction of the IR-illuminator output.

An effect of the present invention, according to several embodiments thereof, is that the entire image sensor may be used as a light sensor. In the assessment of the ambient light level the intensity could be measured as a single value, or as a processed sum of some or all pixel intensities, e.g. by taking the average of some or all pixel values and normalize by the exposure time and gain. In other embodiments the full resolution and full field of view presently used by the image sensor could be used. In still other embodiments various downscaled resolutions could be used, so as to reduce processing requirement while still enabling a degree of spatial resolution over the imaged scene. Since the entire image sensor may be used in the assessment of ambient light level, the spatial resolution could, in one or several embodiments, be used to an advantage. The spatial resolution makes it possible to select an area in the image of the scene for the assessment, e.g. if a certain area is of particular importance, and the ambient light level in this area is selected as a critical factor. The area may be a preset area, such as an area in the middle of the camera view, or a number of smaller areas distributed in the imaged scene (i.e. over the image sensor), e.g. similar to regular exposure zones. The opposite, that a certain area may be disregarded, is also enabled. An example of that would be that a particular area contains an IR-source, or is particularly dark, and therefore is not representative for the scene as such. Specific areas may also be excluded if they, e.g., contains saturated pixels. In any case, there will by default be a perfect overlap between image sensor data and ambient light sensor data, since the image sensor is the component collecting the data. The effect may be particularly useful when digital zoom is used, since an overall ambient light level may be less and less relevant as a digital zoom is increased (since a gradually smaller portion of the full image sensor is used). An example of this could be a situation when a scene is observed using a fish-eye lens having a very large field of view. In such a situation digital zoom may be used to look at a comparatively small fraction of the scene, and an ambient light level as detected by the entire sensor may not be representative in the smaller field of view selected using the digital zoom. In such an example, parameters of the digital zoom (and pan and tilt) may be accounted for in the method, such that, e.g., only the current view is used for the assessment.

In a practical situation a basis for the decision to switch to day-mode is the sequence of frames (could be a single frame as well) where the external IR-illumination is reduced by a known fraction, which could be 100%, i.e. the IR-illumination could be turned off completely. Also, the sensor area selected for evaluation should be defined. This area could correspond to the full sensor area, which may be relevant for situations where optical zoom and a full field of view is used, meaning that the entire sensor is used for imaging a scene, or a fraction of the full sensor area, which may be relevant when digital zoom or certain inclusion/exclusion areas are used.

The ambient light level, in the area, may be normalized using gain and exposure time in order to obtain a reliable and repeatable measure, after which it may be compared to a threshold value. The threshold value could be calculated or based on historical data. A suggested approach is to use light level value as recorded immediately before the night-mode was initiated, e.g. the evening before, as an anchor point. This would be a true measured value from a situation being close in time and measured with the same setup (e.g. the same camera). This suggested approach has a good chance of being well adjusted to the particular environment in which the camera is installed. The actual threshold may not correspond exactly to that true measured value, but it may at least be set with that true measured value as input. However, it should be obvious that other methods could be used as well, on their own or as different alternatives depending on a current situation. Suitable thresholds could be tabulated already when the camera is calibrated, in a factory prior to delivery, or during a calibration phase in connection to an installation. Such calibration would then be compensated in regard of changes in gain and exposure time for the particular situation.

Notably, instead of using a direct measure of the ambient light level as such, other measures could be used as well or instead as an indicator for the light level, such as a signal-to-noise ratio, contrast, etc. Basically, any parameter that is affected by the ambient light level will be a candidate for use. Even if not all measures scales reliably enough for making interpolations or extrapolations in embodiments with reduced IR-illumination, for embodiments where the external IR-illumination is completely turned off during the assessment such measures may be straightforward in answering the question, "is there enough ambient light or not". A particularly suitable indirect measure from a practical standpoint is the current exposure, i.e. the exposure time times the gain, a measure generated by an autoexposure algorithm as an optimal setting for a particular image frame, which in a normal situation would be applied on subsequent image frames. This or similar measures/parameters are produced by most autoexposure algorithms and therefore they may be produced fast and without much additional processing power. When using this type of parameter, the threshold may be given a more dynamic character. For scenarios where an increased exposure time is acceptable, the threshold for the ambient light level may be lower, compared to a situation where a fps-setting or motion in the imaged scene necessitates the use of shorter exposure times (and thus a higher ambient light level for successful imaging). For most embodiments of the present invention the current exposure is NOT applied on subsequent image frames when evaluated from the sequence of image frames acquired during the inventive assessment.

Following the evaluation of the measure representing the ambient visual light level, in a portion of the scene or in the full scene, a decision may be taken, and if found suitable the IR-cut filter may be inserted and the camera may start operating in day-mode. The evaluation itself does not consume a lot of computational or electrical power, yet there is no need for it to be performed continuously, which opens up for a set of various embodiments. These embodiments may be combined in various manners. According to one embodiment the evaluation is performed at regular intervals, such as every couple of minutes (1, 2, 3 . . . , 10, 20, etc.). For an outdoor installation where the sunlight is the only source of ambient light, the evaluation may be synchronized with the rise of the sun, such that the evaluation is not performed at all when there is no sunlight, and starts at a time when there is a chance of sufficient ambient sunlight for day-mode operation. The time may vary with time of year in a very predictable way, and it may also vary with the current weather situation in a less predictable way. In such an embodiment the data regarding a suitable time may be fed to the camera in a user interface (by the setting of an actual time, or by setting a current time and an approximate geographical position of the camera, etc.). It may also be a statistically based decision meaning that the camera could learn when a suitable time would be based on the decision from previous days. For an indoor installation sunlight may be irrelevant for the control, and in such a situation working hours or a history of when the location is used (i.e. when indoor lighting is usually activated) could be used in a corresponding way. In still other embodiment the timing of the evaluation could be triggered by an event in the scene. If someone enters an indoor location where the camera is arranged and flicks on the light, there will be a detectable change in intensity in the image of the scene. Such a change may be used as a trigger for the evaluation. Similar approaches may be used of outdoor installations as well, in particular in locations where artificial lighting is installed.

The invention claimed is:

1. A method for assessing an ambient light level during video acquisition with a video camera, the method comprising:
  acquiring a stream of images with the video camera in a night mode, with an IR illuminator having a first illumination output level, wherein the video camera is operably connected with the IR illuminator, and has a day mode in which an IR-cut filter is arranged in front of an image sensor and the night mode in which the IR-cut filter is not arranged in front of the image sensor;
  reducing an output level of the IR illuminator from a first illumination output level to a predetermined illumination output level during acquisition of a sequence of a predetermined number of consecutive image frames within the image stream, wherein the reduction of the output level of the IR illumination is a sudden change;
  assessing a measure representative of an ambient light level from an evaluation of the sequence of image frames during which the output level of the IR illumination is reduced from the first illumination output level to the predetermined illumination output level, under a condition that a contribution of visual light is unchanged while the output level of the IR illumination is reduced from the first illumination output level to the predetermined illumination output level and while the measure representative of the ambient light level is assessed, by computing a contribution of the IR illumination to a measured value by the image sensor using a known reduced amount of the output level of the IR illumination from the first illumination output level to the predetermined illumination output level, and by computing a contribution of the ambient light to the measured value by the image sensor excluding the contribution of the IR illumination; and using the assessed measure as input to a controller for the IR-cut filter, and switching the video camera to the day mode in response to the assessed measure passing a threshold value.

2. The method of claim 1, further comprising increasing the output of the IR illuminator following the reduction in the output level.

3. The method of claim 1, wherein the measure representative of the ambient light level is selected from the group comprising: a measure of current exposure, a measure of signal-to-noise ratio, and a measure of a light intensity, or any combination thereof.

4. The method of claim 1, comprising processing the sequence of image frames acquired with reduced IR illumination such that their brightness resembles that of the surrounding frames.

5. The method of claim 1, wherein the sequence of image frames is removed from the image stream prior to leaving an encoder associated with the video camera.

6. The method of claim 1, wherein each frame in the sequence of image frames is marked so as not to be shown in a later display of the image stream.

7. The method of claim 1, wherein the predetermined illumination output level corresponds to a level between 0 and 100% of the first illumination output level.

8. The method of claim 7, wherein the predetermined illumination output level corresponds to zero output from the IR illuminator.

9. The method of claim 1, wherein the sequence of image frames is a single image frame.

10. The method of claim 1, wherein the IR illuminator comprises several different IR-LEDs, and a control of the IR illuminator is performed on a selection of the several different IR-LEDs.

11. The method of claim 1, wherein the method is timed to start using image statistics.

12. The method of claim 1, further comprising checking an operation mode of the video camera, wherein adjustment of the IR illuminator is postponed based on the operation mode of the video camera.

13. The method of claim 1, wherein the assessment is performed on a subsection in the sequence of image frames, the subsection being a specific area of each image frame in the sequence.

14. A video camera configured to perform the method of claim 1, said video camera comprising:
   an image sensor;
   an IR-cut filter arranged in front of the image sensor in day mode and not arranged in front of the image sensor in night mode;
   an IR illuminator, said video camera being connectable to said IR illuminator, and
   a control circuit for the IR illuminator, said control circuit comprising a trigger circuit for reading an output trigger signal from the image sensor and for timing a control of the IR illuminator to an operation of the image sensor read-out.

15. The method of claim 1, wherein the predetermined illumination output level is above zero.

* * * * *